C. H. SHIPMAN.
AUTOMOBILE SIGNALING DEVICE.
APPLICATION FILED JUNE 17, 1916.
1,221,772.
Patented Apr. 3, 1917.
2 SHEETS—SHEET 1.
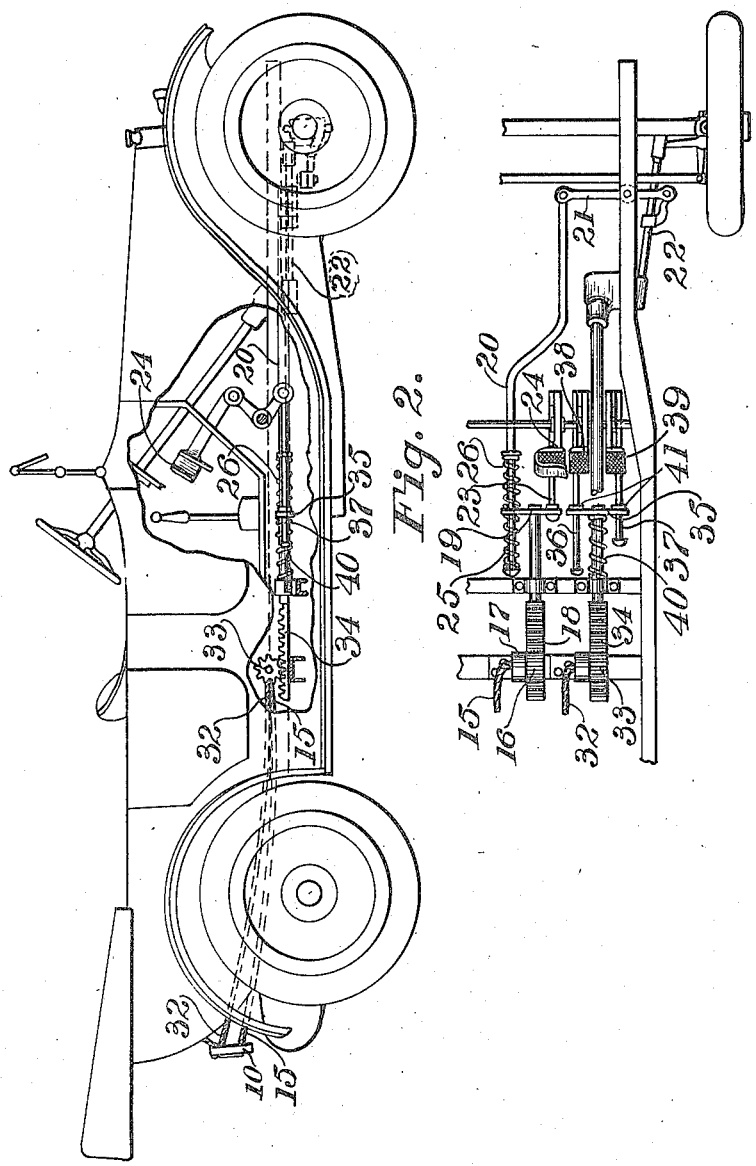
WITNESSES:
INVENTOR
Chas. H. Shipman.
BY
ATTORNEYS

C. H. SHIPMAN.
AUTOMOBILE SIGNALING DEVICE.
APPLICATION FILED JUNE 17, 1916.

1,221,772.

Patented Apr. 3, 1917.
2 SHEETS—SHEET 2.

WITNESSES:

INVENTOR
Chas. H. Shipman.
BY Strong Townsend
ATTORNEYS

UNITED STATES PATENT OFFICE.

CHARLES H. SHIPMAN, OF SAN FRANCISCO, CALIFORNIA.

AUTOMOBILE SIGNALING DEVICE.

1,221,772.  Specification of Letters Patent.  Patented Apr. 3, 1917.

Application filed June 17, 1916. Serial No. 104,305.

*To all whom it may concern:*

Be it known that I, CHARLES H. SHIPMAN, a citizen of the United States, residing in the city and county of San Francisco and State of California, have invented new and useful Improvements in Automobile Signaling Devices, of which the following is a specification.

This invention relates to signal devices for automobiles and has for its object to indicate to vehicles in the rear, the direction of turning and intention to slow down or stop.

In carrying out this object, I employ a signal device visible from the rear and containing a movable pointer to indicate the direction of turning; disappearing "Slow" and "Stop" signs, electric lamps in connection with the indicator and "Slow" and "Stop" signs, operative connections between the automobile steering mechanism and the pointer, whereby turning of the front wheels of the vehicle moves the pointer to right or left to indicate the direction of turning; optional manually controlled means for moving said indicator; operative connections between the clutch controlling mechanism of the automobile and the disappearing "Slow" sign, whereby releasing the clutch moves the said sign into view and operative connections between the brake controlling mechanism of the automobile and the "Stop" sign, whereby setting the brake moves said sign into view, and means carried by said indicator and signs for closing the circuit through an appropriate lamp to illuminate the signs or flash a colored signal light for night use.

One form which my invention may assume is exemplified in the following description and illustrated in the accompanying drawings in which—

Figure 1 shows a side elevation of an automobile equipped with my invention, parts of the body being broken away for the sake of clearness.

Fig. 2 shows a plan view of the controlling and actuating mechanism for the signal's device.

Figure 3:
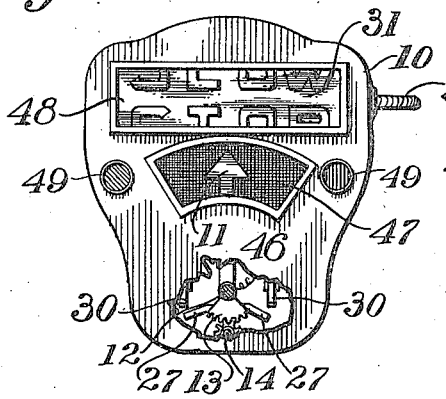
Fig. 3 shows a front elevation of the signal device.
Figure 4:
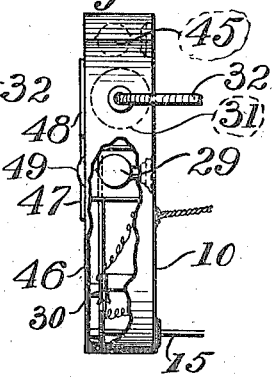
Fig. 4 shows a side elevation of the same.
Figure 5:
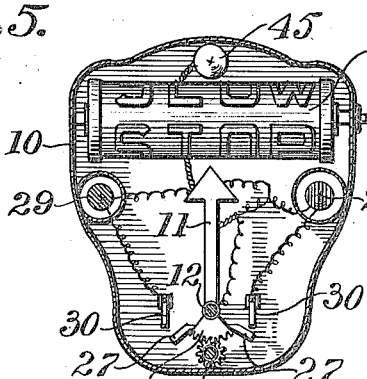
Fig. 5 shows a sectional view in plan of the same.
Figure 6:
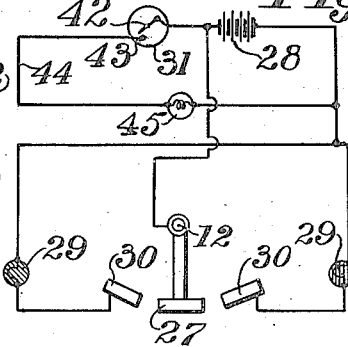
Fig. 6 shows a diagram of the electrical connections employed in the signal device.
Figure 7:
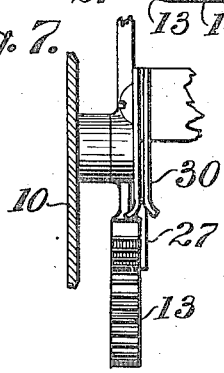
Figs. 7 and 8 show detailed views of the pointer actuating means.
Figure 8:
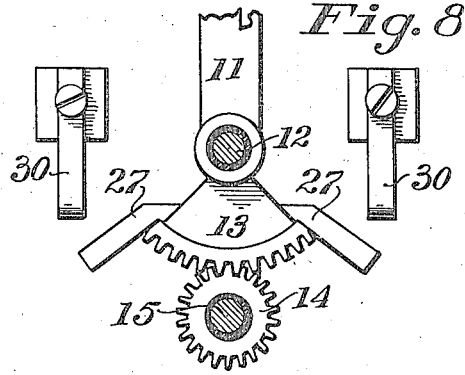

In the drawings, an automobile is shown as carrying a signal device at its rear, comprising a casing 10 in which is mounted a normally vertical pointer 11 pivoted at 12 and carrying at its lower end a segmental rack 13, the latter meshing with a pinion 14 carried on a flexible shaft 15. The said shaft 15 is extended forwardly to a pinion 16 journaled on a support 17 fixed to the frame of the automobile, and meshes with a toothed rack 18 slidable fore and aft on said frame.

The rack at its forward end has a cross-head 19, slidably received, in which at one end is a rod 20, running to a lever 21 fulcrumed on the frame and connected to the reach rod 22 of the steering mechanism of the automobile. A rod 23 is rigidly attached to the other end of the cross-head and extends to a special, manually controlled hand lever or foot-pedal 24 within easy access to the operator. The rod 20 has compression springs 25—26 on it engaging with opposite sides of the cross-head to form a yielding connection, whereby to actuate the rack 18 in either direction when the steering mechanism is moved and thereby swing the pointer 11 to indicate the direction of turning. When it is desired to manually operate the indicator, the lever 24 is actuated in the proper direction. On account of the yielding connections between the steering mechanism and rack, the lever 24 may be actuated at any time and regardless of the adjustment of the steering mechanism. This is especially desirable for an advance operation of the indicator, as is sometimes required where traffic is dense, but for ordinary conditions the automatic operation of the indicator by the turning of the front wheels will suffice.

The segmental rack 13 carries a contact 27 at either end in electrical connection with a battery 28, the latter supplying current to lamps 29 mounted in the cabinet 10. Preferably there are two such lamps 29, one showing red to indicate turning to the left and one showing green to indicate turning to the right, or any other combination desired. These lamps also illuminate the pointer. A stationary contact 30 is connected with each lamp and occupies a position to be engaged by the adjacent contact 27 when the pointer is swung to one side or the other, whereby to close the circuit through the particular lamp which indicates by color the direction of turning.

Included in the cabinet 10 is a rotatable cylindrical member 31 carrying on its periphery the words "Stop" and "Slow" or other appropriate designations to indicate danger when the vehicle is being slowed down or stopped. This cylinder is operated by a flexible shaft 32, which connects with a pinion 33 journaled on the car body and operated by a toothed rack 34.

The rack 34 carries a cross-head 35, slidably fitted in which at either end are rods 36—37. These rods extend forwardly, one (36) to a foot pedal 38 which is the usual one in automobiles for controlling the clutch mechanism, while the other rod (37) extends to, and is connected with, a foot pedal 39 which is used regularly for controlling the transmission brake.

The rack 34 is held forwardly by a spring 40, in which position neither sign on the cylinder or roll is displayed. Pins 41 on the rods 36—37 are arranged to engage the cross-head and thrust the rack rearwardly when the rods are removed. The connection of the rod 36 to the clutch pedal is such that the rod will be moved rearwardly when the clutch is being released, and the connection of the rod 37 to the brake pedal is such that said rod will be moved rearwardly to a greater extent when the brake is being set. Furthermore, the rod 37 is designed to give a longer movement than the rod 36, and the latter has a longer sliding connection with cross-head. A movement of the pedal 38 to release the clutch will therefore actuate the cylinder a short distance and exhibit the sign "Slow" and a movement of the pedal 39 to set the transmission brake will turn the cylinder a greater distance and thereby display the sign "Stop."

The spring 40 will return the cylinder. The cylinder has a contact 42 on its periphery to engage with a stationary contact 43 when turned to display the "Slow" or "Stop" signs, whereby to close a circuit 44 connected with the battery 28 and in which is included a lamp 45 so positioned as to illuminate the signs and make them visible at night.

The casing 10 has a cover 46 in which is an arcuate window 47 to disclose the movements of the pointer 11, and a second window 48 with which the signs "Stop" and "Slow" register. Colored bull's-eyes or windows 49 in the cover permit the lamps 29 to show through in the desired colors.

As will be understood from the foregoing description, movement of the steering mechanism to turn the automobile at a corner, will impart movement to the pointer 11 in a direction to indicate the course of turning. Slight movements of the steering wheel will impart movement to the pointer and in order that such slight movements may not confuse the operators of vehicles in the rear, I prefer to paint the central portion of the window 47 black, or otherwise cover it so that the pointer shall not be visible except when moved a sufficient distance to indicate a substantial turning movement of the vehicle. As the pointer nears its limit of movement, the circuit through the appropriate lamp will be closed and a colored light exhibited which is of great importance for night use to indicate the direction of turning. In slowing down, the first operation of the controlling mechanism of the automobile is to release the clutch and therefore by connecting the "Slow" sign to the clutch pedal, a signal will be automatically displayed to those in the rear, indicating the intention to slow down. Following the releasing of the clutch, the brake will be set, if it is desired to attain a full stop, and thereupon the "Stop" sign will come into view, so that those in the rear will have ample notice of the contemplated stopping of the vehicle.

While I have shown and described herein but one form of my invention, it will be understood nevertheless, that the same is susceptible of modification, and therefore many changes in the construction and arrangement of the several parts may be employed without departing from the spirit of my invention, as disclosed in the appended claims.

Having thus described my invention, what I claim and desire to secure by Letters Patent is—

1. In an automobile signaling device, a casing, a rotatable member therein, a flexible shaft secured at one end to the member, a pinion fixed on the opposite end of the shaft, a slidably mounted rack meshing with the pinion and provided with a rod extension, a cross head on the rod extension, and independently operable means connected with each end of the cross head for sliding the rack.

2. In an automobile signaling device, a casing, a rotatable member therein, a flexible shaft secured at one end to the member, a pinion fixed on the opposite end of the shaft, a slidably mounted rack meshing with the pinion and provided with a rod extension, a cross head on the rod extension, means for operating the rack having slidable connection with the cross head, and other means for operating the rack also having connection with the cross head.

3. In an automobile, a signaling device including a rotary part, a rack carried by the automobile for sliding movement, a flexible shaft connected at one end to the rotary part, a pinion on the opposite end of the shaft meshing with the rack, a cross head fixed to the rack, and a plurality of operating means each slidable relative to the other and having connection with the cross-head for operating the rack.

4. In an automobile, the combination with the steering gear, of a signaling device including a slidable rack, a cross head fixed thereon, a rod connected to the steering gear and slidably connected to the cross head for sliding the rack upon movement of the steering gear, resilient means on the rod rendering the slidable connection yieldable, and manually operable means connected to the cross head and operable independently of the steering gear to move the rack in one direction, said resilient means acting to move the rack in the opposite direction.

In testimony whereof I have hereunto set my hand in the presence of two subscribing witnesses.

CHARLES H. SHIPMAN.

Witnesses:
  MILTON A. NATHAN,
  E. FILMORE.